United States Patent
Zessin et al.

(10) Patent No.: US 8,626,880 B2
(45) Date of Patent: Jan. 7, 2014

(54) EMBEDDED CONFIGURATION VARIANCE DETECTOR

(75) Inventors: Steven P. Zessin, Austin, TX (US); Jon R. Hass, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 174 days.

(21) Appl. No.: 13/177,231

(22) Filed: Jul. 6, 2011

(65) Prior Publication Data

US 2013/0013753 A1 Jan. 10, 2013

(51) Int. Cl.
*G06F 15/177* (2006.01)

(52) U.S. Cl.
USPC ........... 709/220; 709/223; 709/224; 717/121; 717/170

(58) Field of Classification Search
USPC ........... 709/220, 223, 224; 702/186; 718/100; 717/121, 170; 706/47; 714/819; 710/18
See application file for complete search history.

(56) References Cited

U.S. PATENT DOCUMENTS

| | | | |
|---|---|---|---|
| 7,177,348 B2 | 2/2007 | Yang | |
| 7,421,688 B1 | 9/2008 | Righi et al. | |
| 2003/0236970 A1 | 12/2003 | Palmer et al. | |
| 2008/0071939 A1* | 3/2008 | Tanaka et al. | 710/18 |
| 2009/0254863 A1 | 10/2009 | Hass et al. | |
| 2010/0058157 A1* | 3/2010 | Kelly et al. | 714/819 |
| 2010/0082518 A1* | 4/2010 | Gaffga et al. | 706/47 |
| 2010/0180110 A1 | 7/2010 | Mittapalli et al. | |
| 2011/0145789 A1* | 6/2011 | Rasch et al. | 717/121 |
| 2012/0110142 A1* | 5/2012 | Montagna et al. | 709/220 |
| 2012/0167094 A1* | 6/2012 | Suit | 718/100 |
| 2012/0303325 A1* | 11/2012 | DePue et al. | 702/186 |

OTHER PUBLICATIONS

U.S. Appl. No. 12/915,407, filed Oct. 29, 2010.

* cited by examiner

*Primary Examiner* — Le H Luu
(74) *Attorney, Agent, or Firm* — Larson Newman, LLP

(57) ABSTRACT

An information handling system includes a connection via a network interface to a network, an embedded service processor, and a storage device. The connection via a network interface is adapted to receive data representing configuration settings of a baseline information handling system. The embedded service processor is adapted to compare the data representing the configuration settings of the information handling system to the data representing the configuration settings of the baseline information handling system. The storage device is adapted to store the data representing the differences between the configuration settings of the information handling system and the configuration settings of the baseline information handling system.

20 Claims, 3 Drawing Sheets

EMBEDDED CONFIGURATION VARIANCE DETECTOR

FIELD OF THE DISCLOSURE

This disclosure relates generally to information handling systems, and relates more particularly to embedded information handling system platform management and configuration variance detection.

BACKGROUND

Configuration of an information handling system can be a complex task. Comparison of a selected system to be configured with a baseline system having a desirable configuration can facilitate configuration but can be a time consuming, tedious, and error prone task. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data processing and storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a network server or storage device, a switch router, wireless router, or other network communication device, a personal computer, a PDA, a consumer electronic device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
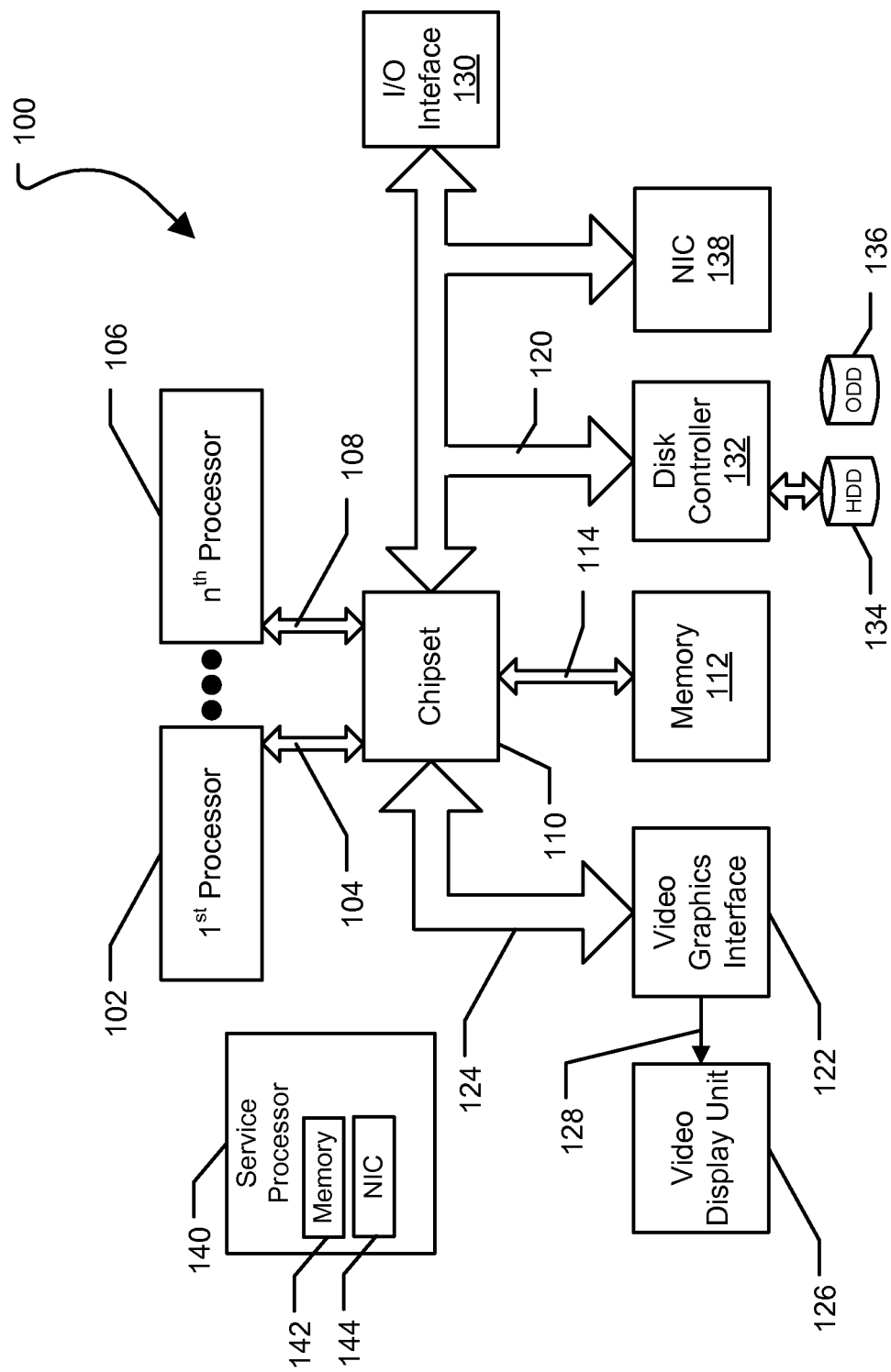
FIG. 1 is a block diagram of a general information handling system including a service processor in accordance with a specific embodiment of the present disclosure.

FIG. 1 illustrates a general information handling system, generally designated at 100. In one form, the information handling system 100 can be a computer system such as a server. The information handling system 100 may contain numerous components, some examples of which are depicted in FIG. 1. Several example components are discussed herein. It should be appreciated by one of skill in the art that other information handling system components may be included or subtracted from the example components shown in FIG. 1.

As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 101 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 101. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 101 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 11 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive. The internal disk drives may include a Solid State Drive (SSD) (not shown) such as flash memory, EEPROMs or any other type of solid state storage media.

The information handling system 100 can further include network connectivity via a network interface controller (NIC) 138 coupled to the I/O Interface 130. The NIC 138 may include any suitable system, apparatus, or device operable to serve as an interface between the information handling system 100 and a network. The NIC 138 may enable the information handling system 100 to communicate over one or more wired or wireless networks using any suitable network transmission protocols or standards for communication over the network. The networks may include communication infrastructure which provide physical connections and a management layer to communicatively couple information handling system 100 and NIC 138 to other information handling systems and networked components. For example, a network may be implemented as, or part of, a storage area network (SAN), a personal area network (PAN), a local area network (LAN), a wide area network (WAN), a wireless local area network (WLAN), a virtual private network, an intranet, the Internet or any other appropriate architecture or system that facilitates the communication of signals, data and/or messages. Communication protocols may include without limitation, for example, Fibre Channel, Frame Relay, Asynchronous Transfer Mode (ATM), Internet Protocol (IP), small computer system interface (SCSI), Internet SCSI, serial advanced technology attachment (SATA), Hypertext Transport Protocol (HTTP), Dynamic Host Configuration Protocol (DHCP) or any combination of these or other network protocols.

The information handling system 100 can include a service processor 140 to enable remote monitoring and management of the information handling system 100. Typically, a service processor controls and monitors power supplies, cooling systems, system sensors among other functional aspects of the information handling system 100. The service processor may contain its own CPU, memory 142, power supply (not shown), and NIC 144. Additionally, the service processor may be connected to many, if not all, of the components of the information handling system 100 shown in FIG. 1. The service processor may even be connected to system peripherals including I/O devices, RAID memory, or devices operating via a NIC.

In one embodiment, the service processor NIC 144 may be a dedicated NIC or, alternatively, it may be a NIC shared with the information handling system. The service processor may be connected via a network connection, such as an Ethernet connection, to a remote information handling system serving as a management station. Secure connection may be established with the management station or an alternative remote information handling system. Example secure connections via NIC 144 can include network communication using secure protocols such as HTTPS and messaging via communication protocols such as the Simple Object Access Protocol (SOAP). Remote management may be conducted via the NIC 144 using management protocols such as WS-Management (WSMAN) protocol, RMCP, SNMP, or similar protocols.

The service processor 140 and its connections to information handling system components permit data to be acquired from the various components. For example, the service processor 140 may read registers at the various components of information handling system 100 and acquire data that relates to configuration settings for a variety of attributes of each component. For example, a device driver that is associated with a disk drive may have several attributes that relate to the disk drive component. There may be dozens of attributes associated with the disk drive component. Fundamentally, whether or not the disk drive is enabled is one attribute. Other example disk drive attributes may relate to settings for power saving options, caching enablement, and drive partitioning among others. Each component within the information handling system 100 is set up similarly with multiple attributes associated with the component that define its configuration within the overall configuration of the information handling system 100.

The information handling system 100 may run on a Unified Extensible Firmware Interface (UEFI) compliant basic input/output system (BIOS) (not shown) in accordance with a specific embodiment of the present disclosure. The UEFI BIOS may be stored in flash memory that may be connected to the information handling system 100 via the disk controller 132. The UEFI BIOS may include a Human Interface Infrastructure (HII) database. The HII database may be used to store information describing the configuration of components included at the information handling system 100, and to provide an interface through which the configuration of components in the system 100 can be manipulated.

The information handling system 100, and the UEFI BIOS in particular, is preferably substantially compliant with one or more revisions of the UEFI specification. Furthermore, the UEFI BIOS includes enhancements to extend the existing capabilities of the UEFI specification in order to provide particular operational benefits above the existing UEFI specification. In an embodiment, a method and a corresponding system is disclosed to facilitate analysis of the configuration of selected system attributes in the information handling system. For example, UEFI compliant device drivers associated with subsystem components may disclose respective configuration information. In a particular example, a UEFI compliant driver associated with a disk drive component may include data defining configuration attributes for the driver. Consequently, application software, such as system configuration software, can manage and detect the configuration of the component in the information handling system.

The techniques disclosed herein can be used by application software to detect and quantify component configuration variances between a selected information handling system and a "baseline" configuration in a baseline information handling system. The administration and configuration of information handling systems may be conducted both locally and remotely. An application program comprising an embedded system comparison tool is a systematic methodology to discover devices and associated configurable attributes in a systematic manner within the information handling system. For example, an embedded system comparison application running on a service processor 140 can extract configuration information from an information handling system using UEFI protocols, and determine a relationship between the configuration options and the various devices included in the system.

The embedded system comparison tool may be implemented as an embedded component within the system. Specifically in one embodiment, the embedded system comparison tool may be embedded within the service processor in the information handling system. The embedded system comparison tool in the described embodiment may be part of the service processor firmware. In an alternative embodiment, the embedded system comparison tool may be part of a BIOS/UEFI application for management of the selected information handling system. Example components of the information handling system assessed by the embedded system comparison tool can include system BIOS, RAID, NIC, and other hardware and firmware components.

With the embedded system comparison tool functionality, an information handling system selected for analysis may have the embedded ability to compare itself against another information handling system and calculate the differences in configuration information. The embedded tool in a selected information handling system may use a baseline information handling system as a target or baseline of system configuration information and settings for the selected information handling system. The baseline information handling system data may be acquired via an internet protocol address pointing to the baseline information handling system.

The embedded system comparison tool is also remotely accessible. As long as the services processor is active or the system is running the BIOS/UEFI application and the baseline information handling system is accessible via a network, the tool can be utilized. The embedded comparison tool will remotely acquire the baseline system information using secure network protocols currently implemented in the information handling system and the BIOS/UEFI running on the system. The NIC 144 may be used for example to support remote access by a management station via a secured network connection.

Figure 2:
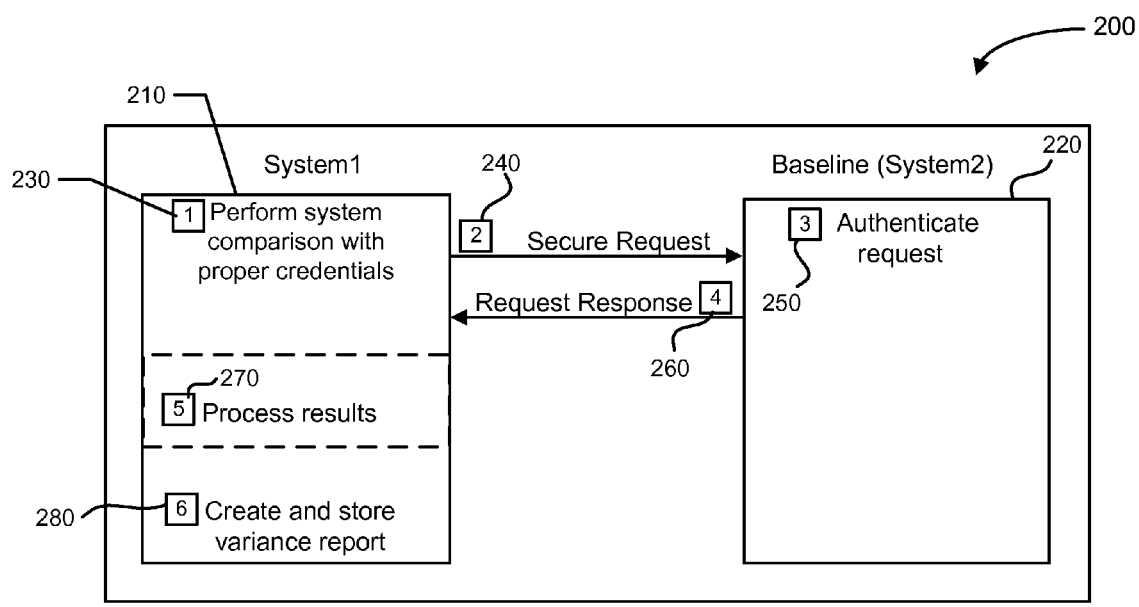
FIG. 2 is a drawing showing system comparison between a selected system using an embedded system comparison tool and a baseline system.

FIG. 2 shows a comparison 200 between a selected information handling system (system 1) 210 and a baseline information handling system (system 2) 220. It can be appreciated that any two information handling system configurations may be compared using the embedded comparison tool and the method disclosed. The embedded comparison tool establishes proper credentials 230 and inputs the baseline information handling system address to execute a comparison. With the credentials and address, a secure request 240 is placed from the selected information handling system 210 to the baseline information handling system 220 via any type of wired or wireless network connection or connections such as those described above. For example, the secure request may be sent via the WSMAN protocol to the baseline system 220. The baseline information handling system 220 authenticates the request at 250. In the described embodiment, the baseline information handling system 220 collects configuration data and provides a request response 260 to the selected information handling system 210. The baseline information handling system configuration data and settings for various attributes may be detected from registers at the baseline information handling system's components. These data settings provide the baseline information handling system's configuration. In an alternative embodiment, the baseline configuration data and settings may have been previously collected for provision with the request response 260.

The request response 260 provides the target baseline information handling system data to the selected information handling system 210. This may include baseline configuration data relating to boot configuration, system BIOS, NIC, RAID and other components. The target baseline information handling system configuration data may be received at the service processor of the selected information handling system 210.

The embedded comparison system tool in the selected information handling system 210 service processor processes the target baseline information handling system data 270 to perform the configuration variance calculations on the selected information handling system 210. The algorithm shown in FIG. 3 and described below may be used to parse and compare the system configurations. The configuration variance calculations show the difference between the selected information handling system 210 and an information handling system with the desired baseline configuration 220. These calculated differences are useful to efficiently manage the selected information handling system's configuration or detect differences that may explain operational differences between the compared systems.

The embedded system comparison tool may calculate differences from among hundreds of attributes and configuration details for the information handling system platform, its storage, and its I/O subsystems. Generally, the configuration information can comprise hardware inventory data including types of hardware present and how that hardware is connected. Configuration information may comprise firmware inventory data including what versions of firmware are present. Configuration information may also comprise configuration inventory that can include huge volumes of data. For example, BIOS configurations may comprise hundreds of attribute settings, RAID configurations may comprise dozens of attribute settings, and hard disk drives, virtual drive or other storage systems may comprise dozens of individual settings each. NICs may comprise the type of network interface as well as thousands of settings relating to partition levels and controls. Many additional hardware components discussed above in the context of information handling systems may each have a multitude of settings. Those settings may also be detected on a baseline information handling system for comparison to the selected information handling system. A manual comparison of each server configuration against a desired baseline may be time consuming, tedious, and error-prone.

At 280, the embedded comparison system may generate a report outlining the differences between the selected information handling system 210 and the baseline information handling system 220. This variance report may be stored in the selected information handling system's database or stored at another storage location. Similarly the variance report may be displayed by the selected information handling system, or may be sent to a different information handling system for display. For example, a variance report may be sent to a PDA or smartphone for use in configuration synchronization by a technician. Alternatively, the variance report may be sent to and stored at a remote management station for display to a remotely located system configuration technician. Analysis of the variance report may alternatively be used to determine causes in code errors that appear when code is run on one information handling system, but do not appear on a baseline information handling system when the same code is run.

Figure 3:
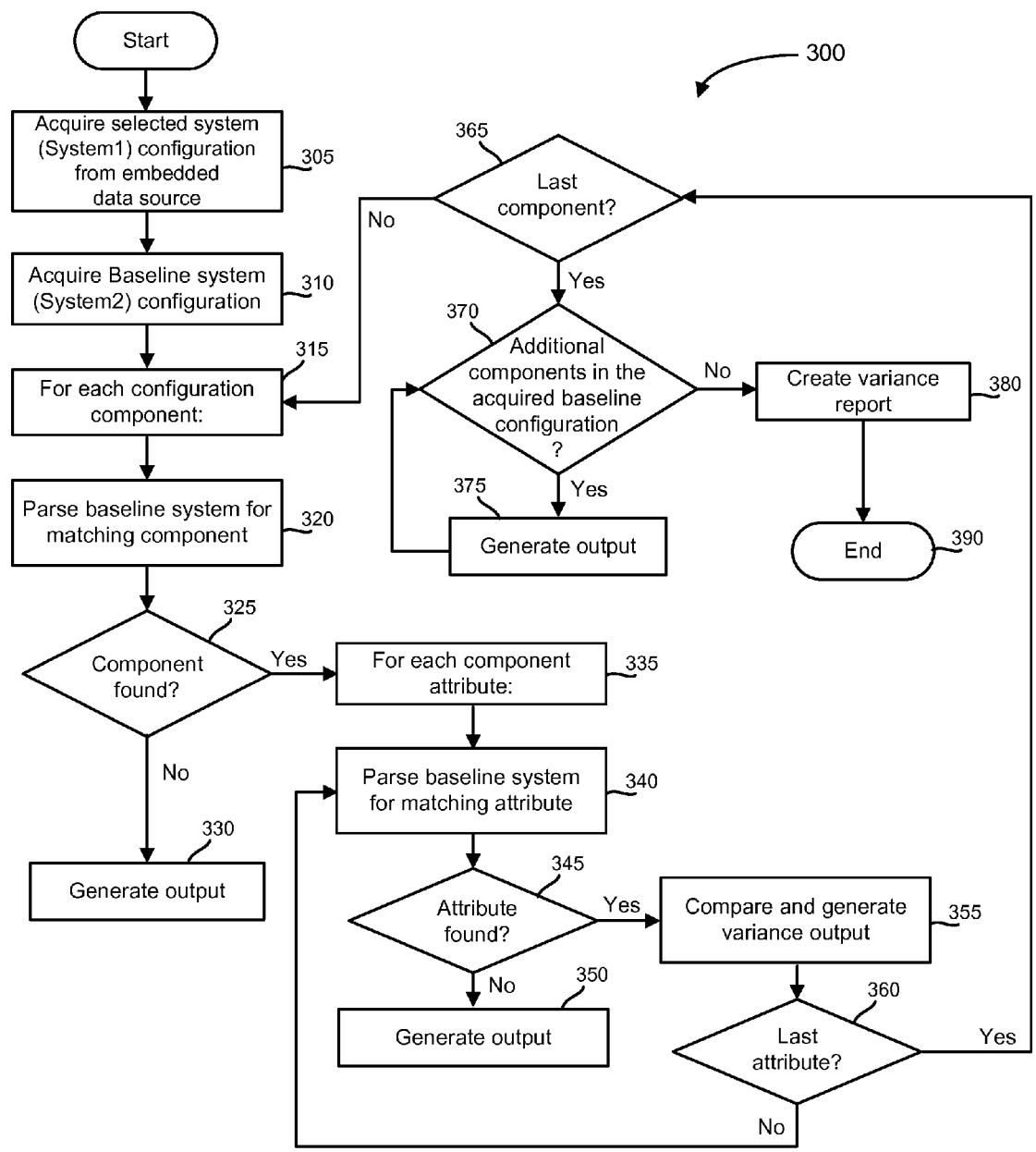
FIG. 3 is a flowchart showing an example method of an embedded system comparison.

FIG. 3 illustrates a flowchart showing an example method of an embedded system comparison. According to one embodiment, method 300 may begin at step 305. As noted above, the teachings of the present disclosure may be implemented in a variety of ways within the embedded system comparison tool described in FIG. 3. The preferred beginning point and the order of steps 305-390 comprising method 300 may depend on the implementation chosen.

At 305, the embedded comparison tool acquires the selected information handling system (system 1) configuration information from a data source within the selected information handling system. This data source may be a database associated with the service processor of the selected information handling system or may be a tangible storage medium associated with the selected information handling system platform. The selected information handling system configuration data may have been acquired from the selected information handling system by reading the registers of an UEFI BIOS compliant system to acquire data for the several attributes.

At 310, the embedded comparison system acquires the baseline information handling system (system 2) target configuration information via a request response from the baseline information handling system as described above in connection with FIG. 2. The target configuration information includes data for the various attributes of the baseline information handling system as described earlier.

Using hardware inventory information from the configuration data acquired from both the selected and baseline information handling systems, the embedded comparison system conducts a variance analysis by identifying a component for comparison in the selected baseline information handling system at 315. At 320, the embedded comparison system parses the baseline information handling system target configuration data for a matching component. At 325, if a matching component is not found, an output notes the absence of the component at 330 and stores this information in a database. If a matching component is found at 325, the embedded comparison system identifies an attribute for that component in the selected information handling system at 335. At 340, the embedded comparison system parses the baseline information handling system target configuration data to identify a matching attribute. If the attribute is not found at 345, the embedded comparison system notes the absence of the attribute at 350 and stores the information in a database. If the attribute is found at 345, the system assesses the configuration setting values for the selected information handling system and the baseline information handling system at 355. The embedded comparison system then calculates a variance value between the configuration settings of the attribute at 355. This variance value is output and stored in a database.

At 360, the embedded comparison system determines if the last attribute for a component has been reached. If not, the embedded comparison system assesses the next attribute for the component at 335. The system then parses the baseline information handling system target configuration data at 340 for a matching attribute and the processing proceeds as described above for attributes at 340-360.

If the last attribute has been reached at 360, the system assesses whether the last component for the selected information handling system has been analyzed at 365. If the last component has not been assessed, the embedded comparison system assesses the next component for the selected information handling system at 315. The system then parses the baseline information handling system target configuration data at 320 for a matching component and the processing proceeds as described above. The system may determine at 370 what components may remain in the baseline information handling system target configuration data to determine what components exist in the baseline system but are absent in the selected information handling system. This information is noted and stored in a database at 375.

Optionally at 380, the embedded comparison system uses the stored variance data to create a variance report as described above with respect to FIG. 3. The variance report generated by the embedded comparison system may include some or all of the stored variance data and may be customizable to include specific configuration variance information.

A built-in or embedded always-available mechanism to discern the configuration differences between a selected information handling system and an information handling system with a desired baseline configuration has several advantages. Several inefficiencies may be avoided by embedding the software tools to compare a specific information handling system against a baseline configuration and discern the configuration differences. There is no dedicated information handling system needed to run the system comparison tool. There is no need to run agents on the selected information handling systems. The information handling system comparison does not interrupt or otherwise burden the operating system of the selected information handling system if the embedded comparison system is run on the service processor. Finally, the embedded system comparison tool is available and installed when needed to configure the selected information handling system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. An information handling system comprising:
   a connection via a network interface for receiving data representing configuration settings of a baseline information handling system;
   an embedded service processor in the information handling system for comparing data representing configuration settings of the information handling system to the data representing configuration settings of the baseline information handling system; and
   a storage device for storing data representing differences between the configuration settings of the information handling system and of the baseline information handling system.

2. The system of claim 1, wherein the service processor generates and stores a variance report representing the differences in configuration settings between the information handling system and the baseline information handling system.

3. The system of claim 1, wherein the service processor compares data representing a component inventory of the information handling system to data representing a component inventory of the baseline information handling system.

4. The system of claim 1, wherein the service processor compares, on a component by component basis, data representing component attributes of the information handling system to data representing component attributes of the baseline information handling system.

5. The system of claim 4, wherein the service processor determines differences for component attribute setting values between the data representing attribute settings of the information handling system and data representing attribute settings of the baseline information handling system.

6. The system of claim 1, wherein the service processor is connected to a network via a network interface and wherein the service processor data comparison is initiated from a remote location and data representing the differences between configuration settings of the information handling system and of the baseline information handling system are transmitted to the same or a different remote location.

7. The system of claim 1, wherein the service processor acquires system configuration data for comparison by reading registers from the information handling system for a plurality of configuration settings upon initiation of an embedded system comparison.

8. A method of embedded system comparison for use with an information handling system, the method comprising:
   acquiring, at an embedded service processor in the information handling system, data representing configuration settings of the information handling system;
   receiving data representing configuration settings of a baseline information handling system;
   comparing the data representing the configuration settings of the information handling system with the data representing configuration settings of the baseline information handling system for similar components; and
   generating variance output data representing differences between the configuration settings of the information handling system and the configuration settings of the baseline information handling system.

9. The method of claim 8, further comprising determining on a component by component basis whether one of the components is part of the data representing the configuration settings of the information handling system and part of the data representing configuration settings of the baseline information handling system and, if not, generating one of the variance output data identifying the absence of the component missing from either the information handling system or the baseline information handling system.

10. The method of claim 8, further comprising determining on an attribute by attribute basis for each component whether the attribute is part of the data representing the configuration settings of the information handling system and part of the data representing configuration settings of the baseline information handling system and, if not, generating a variance output identifying the absence of the component attribute from either the information handling system or the baseline information handling system.

11. The method of claim 8, further comprising comparing data representing the configuration setting for an attribute of a component of the information handling system with data representing the configuration setting for a corresponding attribute of a component of the baseline information handling system and generating variance output data representing the difference between the settings.

12. The method of claim 8, further comprising generating a variance report showing any absent components, any absent attributes, or differences in attribute setting values between the information handling system and the baseline information handling system.

13. The method of claim 8, further comprising remotely accessing the information handling system via a network connection, initiating the system comparison embedded in the information handling system from a remote location, and receiving, at a remote location, the variance output data representing differences between the configuration settings for the information handling system and the configuration settings of the baseline information handling system.

14. The method of claim 8, wherein acquiring, at an embedded service processor in the information handling system further comprises reading registers from the information handling system for a plurality of configuration settings upon initiation of an embedded system comparison.

15. A non-transitory computer readable medium comprising instructions to manipulate an embedded service processor, the instructions comprising instructions to:
   acquire data representing configuration settings of an information handling system;
   receive data representing configuration settings of a baseline information handling system;
   compare the data representing the configuration settings of the information handling system with the data representing the configuration settings of the baseline information handling system for similar components; and
   generate variance output data representing differences between the configuration settings for the information handling system and the configuration settings of the baseline information handling system.

16. The computer readable medium of claim 15, wherein the instructions further comprise: instructions to determine on a component by component basis whether the component is part of the data representing the configuration settings of the information handling system and part of the data representing the configuration settings of the baseline information handling system and, if not, generating a variance output identifying the absence of the component missing from either the information handling system or the baseline information handling system.

17. The computer readable medium of claim 15, wherein the instructions further comprise: instructions to determine on an attribute by attribute basis for each component whether the attribute is part of the data representing the configuration settings of the information handling system and part of the data representing the configuration settings of the baseline information handling system and, if not, generating a variance output identifying the absence of the component attribute from either the information handling system or the baseline information handling system.

18. The computer readable medium of claim 15, wherein the instructions further comprise: instructions to compare data representing the configuration setting for an attribute of a component of the information handling system with data representing the configuration setting for a corresponding attribute of a component of the baseline information handling system and instructions to generate variance output data representing the difference between the settings.

19. The computer readable medium of claim 15, wherein the instructions further comprise: instructions to generate a variance report showing any absent components, any absent attributes, or variations in settings between the information handling system and the baseline information handling system.

20. The computer readable medium of claim 15, wherein the instructions further comprise: instructions to remotely access the information handling system via a network connection, instructions to initiate the system comparison embedded in the information handling system from a remote location, and instructions to transmit, to the same or a different remote location, the variance output data representing differences between the configuration settings for the information handling system and the configuration settings of the baseline information handling system.

* * * * *